Apr. 24, 1923.
W. J. CONLON
1,453,129
CLUTCH FOR WASHING MACHINES
Filed Aug. 14, 1919   2 Sheets-Sheet 2
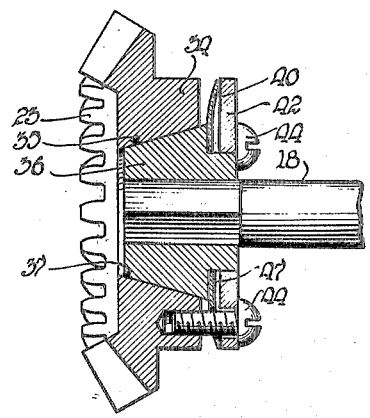
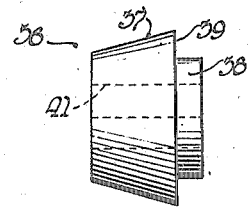
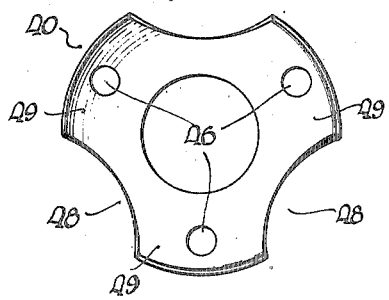
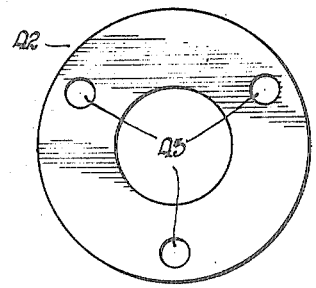
Inventor
Walter J. Conlon
By Brown Boettcher & Dienner
Attorneys Patented Apr. 24, 1923.

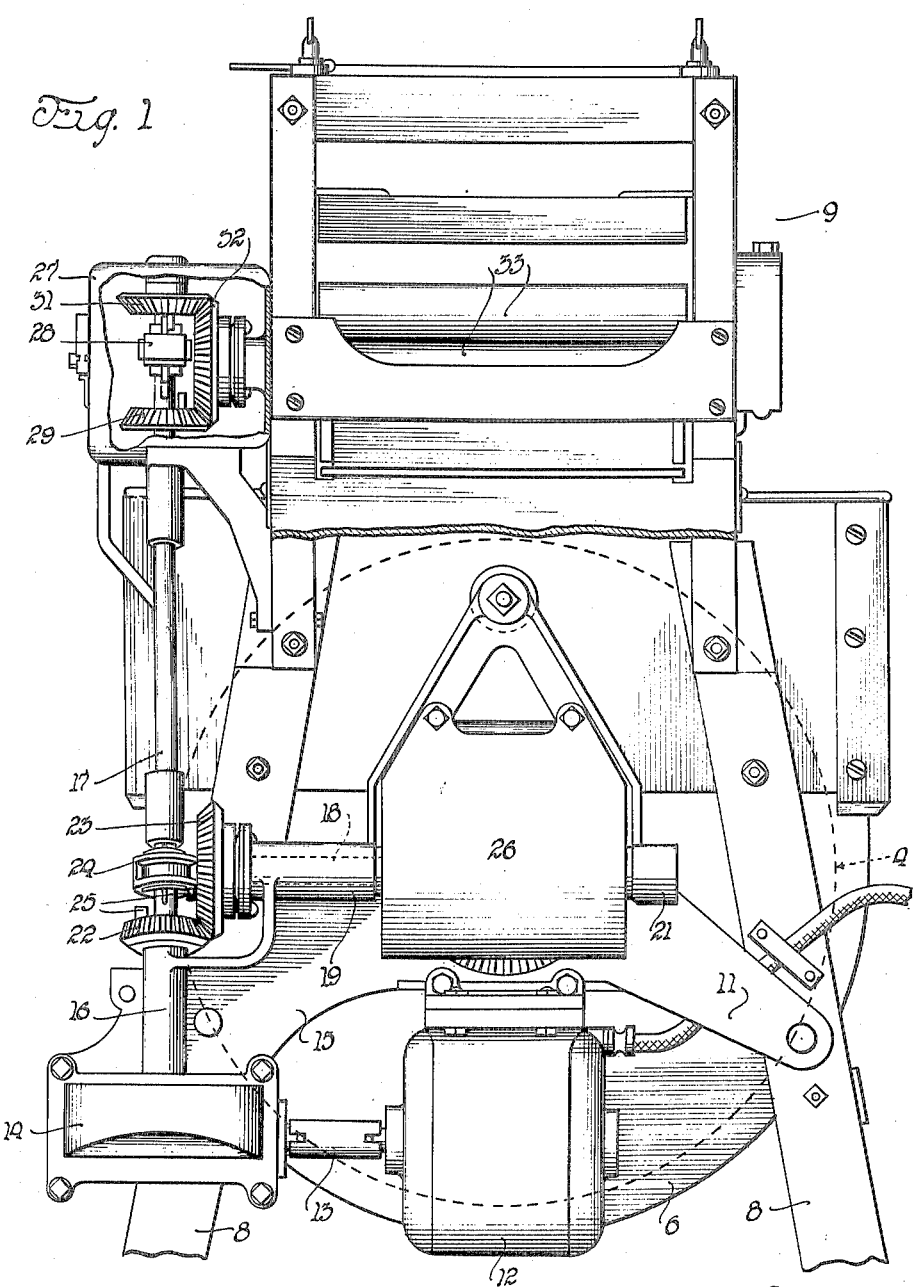

1,453,129

UNITED STATES PATENT OFFICE.

WALTER J. CONLON, OF OAK PARK, ILLINOIS.

CLUTCH FOR WASHING MACHINES.

Application filed August 14, 1919. Serial No. 317,403.

*To all whom it may concern:*

Be it known that I, WALTER J. CONLON, a citizen of the United States, residing at Oak Park, in the county of Cook and State of Illinois, have invented a certain new and useful Improvement in Clutches for Washing Machines, of which the following is a full, clear, concise, and exact description, reference being had to the accompanying drawings, forming a part of this specification.

My invention relates to clutches for washing machines.

More specifically, my invention relates to frictional clutches, the primary function of which is to permit slippage between certain operating parts of the washing machine. The purpose of this type of clutch is twofold; first, to absorb the shock of reversing incident in the periodic reversal of the washing mechanism, and second, to release either the washing mechanism or wringing mechanism from the source of power in the event of either mechanism jamming.

The primary object of the present invention is to provide an improved slippage clutch of very simple, inexpensive and rugged construction.

Another object of the invention is to provide a slippage clutch of this class wherein the pressure between the clutch elements can be readily and easily adjusted to obtain different slippage torques.

Referring to the accompanying drawings wherein I have shown a preferred embodiment of my invention:

Figure 1 is an end elevational view of a washing machine illustrating the relation of the two clutches for releasably driving the washer and wringer mechanisms;

Figure 2 is a detail sectional view of the clutch;

Figures 3, 4 and 5 are isolated elevational views of the driven clutch member, the spring compression member, and the pressure plate respectively.

In Figure 1 I have shown a washing machine of the same general type and construction as shown in my Patent Number 1,254,638. In the washing machine disclosed in this patent I also employ a friction clutch in the cross shaft that drives the washer mechanism for absorbing the shock of reversing.

I shall first describe in brief outline the construction and operation of the washing machine in order to illustrate the utility and relation of the friction clutches, and shall then describe the detail construction of the clutch. The machine comprises a rectangular tank 6 of cylindrical bottom formation in which rotates the cylinder or drum 4 containing the clothes, as indicated in dotted lines. The tank 6 is supported on the corner legs 8, which form part of a supporting structure for supporting the tank 6 and power wringer 9. A frame member in the form of a spider 11 spans the two end legs 8—8 and suspends an electric motor 12 therefrom. The motor 12 has driving connection thru the coupling sleeve 13 with a worm (not shown) which is journaled in the worm housing 14. This housing is formed as part of the spider extension 15, which is also formed with a bearing 16 for receiving what I shall term the power shaft for transmitting power to the washer and wringer mechanisms. This power shaft, which is designated 17, extends into the housing 14 and is keyed to a worm wheel therein (not shown) which meshes with the worm driven by the motor 12. The power shaft 17 is hence being constantly driven at a reduced speed by the motor 12.

The cylinder or drum 4 receives its periodically reversing rotation from the power shaft 17 thru a cross shaft 18 which is supported in bearings 19 and 21 formed integrally on the spider 11. The drive between the power shaft 17 and cross shaft 18 is thru a pair of bevel gears 22 and 23; the bevel gear 22 being loosely mounted on the power shaft 17 and the bevel gear 23 having driving connection with the cross shaft 18. A clutch collar 24, splined on the power shaft 17, is adapted to be shifted by any suitable operating means to bring the clutching lugs 25—25 into operative engagement. A reversing mechanism similar to that disclosed in Patent Number 1,077,748 issued to Thomas H. Phillips jr., is utilized for transmitting periodically reversing rotation from the cross shaft 18 to the cylinder shaft (not shown). This reversing mechanism is enclosed behind a shield or cover plate 26; no specific showing or description of this mechanism being made for the reason that it forms no essential part of the present invention.

In the operation of the machine the reversing mechanism functions to rotate the cylinder or drum 4 thru a predetermined number of revolutions and then suddenly reverses the rotation of the drum and rotates it in an opposite direction thru substantially the same number of revolutions. It will be obvious that at the instant of reversal the inertia of the cylinder or drum 4 will often be sufficient to produce a mechanical shock of considerable force, which will in turn have a detrimental effect on the machine if not relieved by some cushioning or absorbing means. The slippage clutch which I employ for absorbing this shock of reversal is inserted in the driving train between the power shaft 17 and the shaft of the cylinder 4; the clutch being preferably embodied in the bevel gear 23 inasmuch as this location has the advantages of compactness and accessibility. The compactness follows from the relatively high speed of the cross shaft 18, as compared with the shaft on the drum 7, this higher speed involving a lower torque and consequently a smaller and more compact clutch than is possible on the cylinder shaft. Referring now to the drive for the power wringer 9, it will be noted that the power shaft 17 is extended up into a wringer reversing gear box 27 which is suitably secured on the side of the wringer 9. Inside the gear box 27, the shaft 17 is provided with a clutch collar 28 which is splined thereto and which is adapted for shiftable movement into and out of clutching engagement with either of the bevel pinions 29 and 31. These bevel pinions mesh with a larger bevel gear 32 which has driving connection with the lower of the wringer rolls 33. In providing a slippage clutch for the wringer mechanism I follow precisely the same practice as with the washer mechanism and embody the clutch as part of the bevel gear 32. The clutches for both mechanisms are substantial duplicates, which is of particular advantage in the construction and assembling of the same. The different torque requirements of the washer and wringer mechanism are easily taken care of by the adjustment facility of the clutch.

Referring now to the detail construction of the clutch as shown in Figures 2 to 5 inclusive, it will be noted that the bevel gear 23 is formed with an enlarged hub 34 in which is provided a conical bore 35. Constituting the driven or male clutch member is a conical plug 36 which has a conical clutching surface 37 of the same taper as the bore 35. This plug member is formed with a reduced hub extension 38 which forms the radial abutment shoulder 39 for the engagement of the compression spring member 40. In its center the plug member 36 is formed with a square socket 41 for the reception of the squared end of the shaft 18.

Rotatably mounted on the hub extension 38 of the plug 36 is a circular pressure plate 42. Three equidistant holes 43 are provided in the pressure plate 42 for the free insertion of the three screws 44. The three screws 44 tap into the rear face of the hub 34 and provide means for adjusting the compression pressure on the spring member 40. This spring member consists of a concave spring disk interposed between the plug member 36 and the pressure plate 42. As shown in Figure 4, the spring disk 40 is apertured at three points as indicated at 46 for the passage of the screws 44 which compel the rotation of the disk with the pressure plate 42. This is desirable for the reason that it is preferable to have relative rotation occur between the radial shoulder 39 and the broad inner surface of the disk indicated at 47. Between the apertures 46, the disk 40 is cut out to form arcuate recesses 48, thus leaving the three compression fingers 49. As a result of this construction, the three pressure fingers tend to equalize the distribution of compression pressure about the plug member 36 irrespective of any unequal adjustment of the screws 44. The cutting of the arcuate recesses 48 removes metal which would be subject to buckling in case of unequal adjustment of the screws 44.

It will be apparent that by adjusting the three screws 44, the torque at which the clutch will slip can be adjusted between wide limits. Any wear between the engaging clutch surfaces is automatically taken up by the resiliency of the spring disk 40.

I claim:

1. In a slippage clutch, a first clutch member having a conical bore therein, a second clutch member of conical plug formation engaging in said conical bore, a pressure plate, adjustable screw means extending externally of said second clutch member for securing said pressure plate to said first clutch member, and a spring disk interposed between said pressure plate and said second clutch member.

2. In a slippage clutch, a first clutch member having a clutching surface, a second clutch member having a co-operating clutching surface, a pressure plate, screws passing externally of said clutching surfaces for mounting said pressure plate on said first clutch member, and a concave spring disk interposed between said pressure plate and said second clutch member.

3. In combination, a gear, the hub of said gear having a conical bore therein, a conical plug member engaging in said bore, a shoulder on said plug member, a pressure plate rotatably mounted on said plug member, a plurality of screws passing thru said pressure plate and tapping into the hub of said gear, a concave spring disk interposed between said pressure plate and said plug member, said spring disk abutting the shoulder on said plug member, and adapted to be adjustably compressed by said screws, and a shaft having rigid driving connection with said plug member.

4. In combination, a driving element, a hub on said driving element, a conical bore in said hub, a conical plug engaging in said conical bore, said plug having a reduced hub extension forming an abutment shoulder, a circular pressure plate rotatably mounted on said reduced hub extension, a cup-shaped spring disk engaging said abutment shoulder and said pressure plate, said spring disk having recesses in its periphery thereby forming compression arms, said compression arms having holes therein, screws passing freely thru said pressure plate and thru the holes in said compression arms and tapping into the hub on said driving element, said screws being operable to adjust the compression pressure on said spring disk, and a driven shaft having rigid connection with said conical plug.

5. In a slippage clutch, the combination of a first clutch member, a second clutch member, said clutch members having cooperating clutching surfaces, a presure plate, adjustable screw means passing externally of said clutching surfaces for adjustably mounting said pressure plate on the face of said first clutch member, and a curved spring disk interposed between said pressure plate and said second clutch member.

In witness whereof, I hereunto subscribe my name this 12th day of August, A. D. 1919.

WALTER J. CONLON.